United States Patent
Cai et al.

(10) Patent No.: US 9,382,448 B2
(45) Date of Patent: Jul. 5, 2016

(54) POLYTHIOETHER SEALANTS WITH ENHANCED THERMAL RESISTANCE

(71) Applicant: PRC-DeSoto International, Inc., Sylmar, CA (US)

(72) Inventors: Juexiao Cai, Stevenson Ranch, CA (US); Emilia Serrano, North Hollywood, CA (US); Bruce Virnelson, Valencia, CA (US); Renhe Lin, Stevenson Ranch, CA (US)

(73) Assignee: PRC-DeSoto International, Inc., Sylmar, CA (US)

( * ) Notice: Subject to any disclaimer, the term of this patent is extended or adjusted under 35 U.S.C. 154(b) by 0 days.

(21) Appl. No.: 14/472,428

(22) Filed: Aug. 29, 2014

(65) Prior Publication Data
US 2016/0060484 A1    Mar. 3, 2016

(51) Int. Cl.
| | |
|---|---|
| *C08G 75/04* | (2006.01) |
| *C08G 73/10* | (2006.01) |
| *C09D 181/02* | (2006.01) |
| *C08K 5/134* | (2006.01) |
| *C08K 5/13* | (2006.01) |
| *C09D 163/04* | (2006.01) |
| *C09D 163/00* | (2006.01) |

(52) U.S. Cl.
CPC ............... *C09D 181/02* (2013.01); *C08K 5/13* (2013.01); *C08K 5/1345* (2013.01); *C09D 163/00* (2013.01); *C09D 163/04* (2013.01)

(58) Field of Classification Search
None
See application file for complete search history.

(56) References Cited

U.S. PATENT DOCUMENTS

| | | | | |
|---|---|---|---|---|
| 3,413,261 | A | * | 11/1968 | Schalin et al. ............... 528/374 |
| 3,908,039 | A | | 9/1975 | Guthrie et al. |
| 4,366,307 | A | | 12/1982 | Singh et al. |
| 4,609,762 | A | | 9/1986 | Morris et al. |
| 4,714,778 | A | | 12/1987 | Burgoyne, Jr. et al. |
| 4,891,391 | A | * | 1/1990 | McEntee ...................... 523/122 |
| 5,225,472 | A | | 7/1993 | Cameron et al. |
| 6,172,179 | B1 | | 1/2001 | Zook et al. |
| 6,525,168 | B2 | | 2/2003 | Zook et al. |
| 2005/0010003 | A1 | | 1/2005 | Sawant et al. |
| 2007/0238848 | A1 | * | 10/2007 | Bojkova et al. ................. 528/44 |
| 2010/0010133 | A1 | | 1/2010 | Zook et al. |
| 2010/0041839 | A1 | | 2/2010 | Anderson et al. |
| 2011/0319559 | A1 | | 12/2011 | Kania et al. |
| 2012/0040104 | A1 | | 2/2012 | Keledjian et al. |
| 2015/0065599 | A1 | * | 3/2015 | Kralev et al. .................... 522/8 |

FOREIGN PATENT DOCUMENTS

WO    WO 2012/061498 A2    5/2012

OTHER PUBLICATIONS

BASF, Datasheet for Irganox 1010, Sep. 2010, p. 1-2, www.performancechemicals.basf.com.*

* cited by examiner

*Primary Examiner* — Susannah Chung
*Assistant Examiner* — Robert T Butcher
(74) *Attorney, Agent, or Firm* — William R. Lambert

(57) ABSTRACT

Thiol-terminated polythioether compositions and sealants prepared using the thiol-terminated polythioether compositions that exhibit enhanced retention of elongation following exposure to high temperature are disclosed. The enhanced retention of elongation is realized by incorporating certain phenolic antioxidants into the composition.

10 Claims, No Drawings

POLYTHIOETHER SEALANTS WITH ENHANCED THERMAL RESISTANCE

FIELD

The present disclosure relates to thiol-terminated polythioether compositions and sealants prepared from the thiol-terminated polythioether compositions having enhanced retention of elongation following exposure to high temperatures.

BACKGROUND

Thiol-terminated polythioethers are well-known to be useful in aerospace sealant applications. Aerospace sealants must meet a number of demanding performance requirements that include adhesion, tensile strength, elongation, fuel resistance, and high temperature stability. The properties of certain sealant formulations exhibit significant degradation when exposed to high temperatures for an extended period of time. For example, the elongation value of certain thiol-terminated polythioether formulations can decrease to less than 50% following exposure to 300° F. for seven days. Particularly for thiol-terminated polythioethers cured with a polyepoxy, the pendant hydroxyl groups generated by the curing reaction can be a source of free radicals that degrade the physical properties of a cured sealant.

Thiol-terminated polythioether-based sealant formulations exhibiting enhanced high temperature retention of elongation are desired.

SUMMARY

The high temperature retention of elongation of thiol-terminated aerospace sealant formulations can be enhanced by incorporation certain phenolic antioxidants into the formulation. The high temperature retention of the elongation can be enhanced without compromising other properties associated with high-performance aerospace sealants.

DETAILED DESCRIPTION

For purposes of the following detailed description, it is to be understood that embodiments provided by the present disclosure may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

A dash ("—") that is not between two letters or symbols is used to indicate a point of bonding for a substituent or between two atoms. For example, —$CONH_2$ is attached through the carbon atom.

"Alkanediyl" refers to a diradical of a saturated, branched or straight-chain, acyclic hydrocarbon group, having, for example, from 1 to 18 carbon atoms ($C_{1-18}$), from 1 to 14 carbon atoms ($C_{1-14}$), from 1 to 6 carbon atoms ($C_{1-6}$), from 1 to 4 carbon atoms ($C_{1-4}$), or from 1 to 3 hydrocarbon atoms ($C_{1-3}$). It will be appreciated that a branched alkanediyl has a minimum of three carbon atoms. In certain embodiments, the alkanediyl is $C_{2-14}$ alkanediyl, $C_{2-10}$ alkanediyl, $C_{2-8}$ alkanediyl, $C_{2-6}$ alkanediyl, $C_{2-4}$ alkanediyl, and in certain embodiments, $C_{2-3}$ alkanediyl. Examples of alkanediyl groups include methanediyl (—$CH_2$—), ethane-1,2-diyl (—$CH_2CH_2$—), propane-1,3-diyl and iso-propane-1,2-diyl (e.g., —$CH_2CH_2CH_2$— and —$CH(CH_3)CH_2$—), butane-1,4-diyl (—$CH_2CH_2CH_2CH_2$—), pentane-1,5-diyl (—$CH_2CH_2CH_2CH_2CH_2$—), hexane-1,6-diyl (—$CH_2CH_2CH_2CH_2CH_2CH_2$—), heptane-1,7-diyl, octane-1,8-diyl, nonane-1,9-diyl, decane-1,10-diyl, dodecane-1,12-diyl, and the like.

"Alkanecycloalkane" refers to a saturated hydrocarbon group having one or more cycloalkyl and/or cycloalkanediyl groups and one or more alkyl and/or alkanediyl groups, where cycloalkyl, cycloalkanediyl, alkyl, and alkanediyl are defined herein. In certain embodiments, each cycloalkyl and/or cycloalkanediyl group(s) is $C_{3-6}$, $C_{5-6}$, and in certain embodiments, cyclohexyl or cyclohexanediyl. In certain embodiments, each alkyl and/or alkanediyl group(s) is $C_{1-6}$, $C_{1-4}$, $C_{1-3}$, and in certain embodiments, methyl, methanediyl, ethyl, or ethane-1,2-diyl. In certain embodiments, the alkanecycloalkane group is $C_{4-18}$ alkanecycloalkane, $C_{4-16}$ alkanecycloalkane, $C_{4-12}$ alkanecycloalkane, $C_{4-8}$ alkanecycloalkane, $C_{6-12}$ alkanecycloalkane, $C_{6-10}$ alkanecycloalkane, and in certain embodiments, $C_{6-9}$ alkanecycloalkane. Examples of alkanecycloalkane groups include 1,1,3,3-tetramethylcyclohexane and cyclohexylmethane.

"Alkanecycloalkanediyl" refers to a diradical of an alkanecycloalkane group. In certain embodiments, the alkanecycloalkanediyl group is $C_{4-18}$ alkanecycloalkanediyl, $C_{4-16}$ alkanecycloalkanediyl, $C_{4-12}$ alkanecycloalkanediyl, $C_{4-8}$ alkanecycloalkanediyl, $C_{6-12}$ alkanecycloalkanediyl, $C_{6-10}$ alkanecycloalkanediyl, and in certain embodiments, $C_{6-9}$ alkanecycloalkanediyl. Examples of alkanecycloalkanediyl groups include 1,1,3,3-tetramethylcyclohexane-1,5-diyl and cyclohexylmethane-4,4'-diyl.

"Alkyl" refers to a monoradical of a saturated, branched or straight-chain, acyclic hydrocarbon group having, for example, from 1 to 20 carbon atoms, from 1 to 10 carbon atoms, from 1 to 6 carbon atoms, from 1 to 4 carbon atoms, or from 1 to 3 carbon atoms. It will be appreciated that a branched alkyl has a minimum of three carbon atoms. In certain embodiments, the alkyl group is $C_{1-6}$ alkyl, $C_{1-4}$ alkyl, and in certain embodiments, $C_{1-3}$ alkyl. Examples of alkyl groups include methyl, ethyl, n-propyl, iso-propyl, n-butyl, iso-butyl, tert-butyl, n-hexyl, n-decyl, tetradecyl, and the like. In certain embodiments, the alkyl group is $C_{1-6}$ alkyl, $C_{1-4}$ alkyl, and in certain embodiments, $C_{1-3}$ alkyl. It will be appreciated that a branched alkyl has at least three carbon atoms.

"Cycloalkanediyl" refers to a diradical saturated monocyclic or polycyclic hydrocarbon group. In certain embodiments, the cycloalkanediyl group is $C_{3-12}$ cycloalkanediyl, $C_{3-8}$cycloalkanediyl, $C_{3-6}$cycloalkanediyl, and in certain embodiments, $C_{5-6}$ cycloalkanediyl. Examples of cycloalkanediyl groups include cyclohexane-1,4-diyl, cyclohexane-1,3-diyl, and cyclohexane-1,2-diyl.

As used herein, "polymer" refers to oligomers, homopolymers, and copolymers, which may be cured or uncured. Unless stated otherwise, molecular weights are number average molecular weights for polymeric materials indicated as "$M_n$" as determined, for example, by gel permeation chromatography using a polystyrene standard in an art-recognized manner. Unless stated otherwise, molecular weights are number average molecular weights for polymeric materials indicated as "Mn" as may be determined, for example, by gel permeation chromatography using a polystyrene standard in an art-recognized manner.

"Prepolymers" refer to polymers prior to curing. In general, prepolymers provided by the present disclosure are liquid at room temperature. "Adducts" refer to prepolymers that are functionalized with a reactive terminal group; however, prepolymers may also contain terminal functional group. Thus, the terms prepolymer and adduct are used interchangeably. The term adduct is often used to refer to a prepolymer that is an intermediate in a reaction sequence used to prepare a prepolymer.

Reference is now made in detail to certain embodiments of compounds, compositions, and methods. The disclosed embodiments are not intended to be limiting of the claims. To the contrary, the claims are intended to cover all alternatives, modifications, and equivalents.

Compositions

Compositions provided by the present disclosure include a thiol-terminated polythioether prepolymer and an antioxidant. In certain embodiments, a composition is formulated as a sealant, such as an aerospace sealant.

Polythioethers

Compositions and sealant formulations provided by the present disclosure include a thiol-terminated polythioether.

Examples of suitable polythioethers are disclosed, for example, in U.S. Pat. No. 6,172,179.

In certain embodiments, a thiol-terminated polythioether prepolymer comprises a thiol-terminated polythioether comprising a backbone comprising the structure of Formula (1):

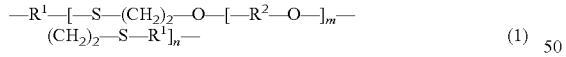

(1)

wherein,
each $R^1$ is independently selected from a $C_{2-10}$ n-alkanediyl group, a $C_{3-6}$ branched alkanediyl group, a $C_{6-8}$cycloalkanediyl group, a $C_{6-10}$ alkanecycloalkanediyl group, a heterocyclic group, a —[(—CHR$^3$—)$_p$—X—]$_q$—(CHR$^3$)$_r$— group, wherein each $R^3$ is selected from hydrogen and methyl;
each $R^2$ is independently selected from a $C_{2-10}$ n-alkanediyl group, a $C_{3-6}$ branched alkanediyl group, a $C_{6-8}$cycloalkanediyl group, a $C_{6-14}$ alkanecycloalkanediyl group, a heterocyclic group, and a —[(—CH$_2$—)$_p$—X—]$_q$—(CH$_2$)$_r$— group;
each X is independently selected from O, S, and —NR—, wherein R is selected from hydrogen and methyl;
m ranges from 0 to 50;
n is an integer ranging from 1 to 60;
p is an integer ranging from 2 to 6;
q is an integer ranging from 1 to 5; and
r is an integer ranging from 2 to 10.

In certain embodiments of a compound of Formula (1), $R^1$ is —[—(—CHR$^3$)$_s$—X—]$_q$—(—CHR$^3$)$_r$— wherein each X is independently selected from —O— and —S—. In certain embodiments wherein $R^1$ is —[—(CHR$^3$)$_s$—X—]$_q$—(CHR$^3$)$_r$—, each X is —O— and in certain embodiments, each X is —S—.

In certain embodiments of a compound of Formula (1), $R^1$ is —[—(—CH$_2$)$_s$—X—]$_q$—(CH$_2$)$_r$— wherein each X is independently selected from —O— and —S—. In certain embodiments wherein $R^1$ is —[—(CH$_2$)$_s$—X—]$_q$—(CH$_2$)$_r$—, each X is —O— and in certain embodiments, each X is —S—.

In certain embodiments, $R^1$ in Formula (1) is —[(—CH$_2$—)$_p$—X—]$_q$—(CH$_2$)$_r$—, where p is 2, X is O, q is 2, r is 2, $R^2$ is ethanediyl, m is 2, and n is 9.

In certain embodiments of Formula (1), each $R^1$ is derived from dimercaptodioxaoctane (DMDO) and in certain embodiments, each $R^1$ is derived from dimercaptodiethylsulfide (DMDS).

In certain embodiments of Formula (1), each m is independently an integer from 1 to 3. In certain embodiments, each m is the same and is 1, 2, and in certain embodiments, 3.

In certain embodiments of Formula (1), n is an integer from 1 to 30, an integer from 1 to 20, an integer from 1 to 10, and in certain embodiments, and an integer from 1 to 5. In addition, in certain embodiments, n may be any integer from 1 to 60.

In certain embodiments of Formula (1), each p is independently selected from 2, 3, 4, 5, and 6. In certain embodiments, each p is the same and is 2, 3, 4, 5, or 6.

Examples of suitable thiol-terminated polythioether are disclosed, for example, in U.S. Pat. No. 6,172,179. In certain embodiments, a thiol-terminated polythioether comprises Permapol® P3.1E, available from PRC-DeSoto International Inc., Sylmar, Calif.

In certain embodiments, a thiol-terminated polythioether comprises a thiol-terminated polythioether selected from a thiol-terminated polythioether of Formula (2a), a thiol-terminated polythioether of Formula (2b), and a combination thereof:

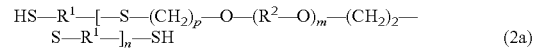

(2a)

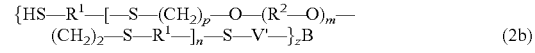

(2b)

wherein,
each $R^1$ independently is selected from $C_{2-10}$ alkanediyl, $C_{6-8}$cycloalkanediyl, $C_{6-14}$ alkanecycloalkanediyl, $C_{5-8}$ heterocycloalkanediyl, and —[(—CHR$^3$—)$_s$—X—]$_q$—(—CHR$^3$—)$_r$—, wherein,
s is an integer from 2 to 6;
q is an integer from 1 to 5;
r is an integer from 2 to 10;
each $R^3$ is independently selected from hydrogen and methyl; and
each X is independently selected from —O—, —S—, and —NR—, wherein R is selected from hydrogen and methyl;
each $R^2$ is independently selected from $C_{1-10}$ alkanediyl, $C_{6-8}$cycloalkanediyl, $C_{6-14}$ alkanecycloalkanediyl, and —[(—CHR$^3$—)$_s$—X—]$_q$—(—CHR$^3$—)$_r$—, wherein s, q, r, $R^3$, and X are as defined as for $R^1$;
m is an integer from 0 to 50;
n is an integer from 1 to 60;

p is an integer from 2 to 6;

B represents a core of a z-valent, polyfunctionalizing agent B($-$V)$_z$ wherein,
z is an integer from 3 to 6; and
each V is a moiety comprising a terminal group reactive with a thiol; and
each —V'— is derived from the reaction of —V with a thiol.

In certain embodiments, Formula (2a) and in Formula (2b), $R^1$ is —[(—CH$_2$—)$_p$—X—]$_q$—(CH$_2$)$_r$—, where p is 2, X is —O—, q is 2, r is 2, $R^2$ is ethanediyl, m is 2, and n is 9.

In certain embodiments of Formula (2a) and Formula (2b), $R^1$ is selected from $C_{2-6}$ alkanediyl and —[—(—CHR$^3$)$_s$—X—]$_q$—(—CHR$^3$)$_r$—.

In certain embodiments of Formula (2a) and Formula (2b), $R^1$ is —[—(—CHR$^3$)$_s$—X—]—(—CHR$^3$)$_r$—, and in certain embodiments X is —O— and in certain embodiments, X is —S—.

In certain embodiments of Formula (2a) and Formula (2b), where $R^1$ is —[—(CHR$^3$)$_s$—X—]$_q$—(CHR$^3$)$_r$—, p is 2, r is 2, q is 1, and X is —S—; in certain embodiments, wherein p is 2, q is 2, r is 2, and X is —O—; and in certain embodiments, p is 2, r is 2, q is 1, and X is —O—.

In certain embodiments of Formula (2a) and Formula (2b), where $R^1$ is —[—(—CHR$^3$)$_s$—X—]$_q$—(CHR$^3$)$_r$—, each $R^3$ is hydrogen, and in certain embodiments, at least one $R^3$ is methyl.

In certain embodiments of Formula (2a) and Formula (2b), each $R^1$ is the same, and in certain embodiments, at least one $R^1$ is different.

Various methods can be used to prepare thiol-terminated polythioethers of Formula (2a) and Formula (2b). Examples of suitable thiol-terminated polythioethers, and methods for their production, are described in U.S. Pat. No. 6,172,179 at col. 2, line 29 to col. 4, line 22; col. 6, line 39 to col. 10, line 50; and col. 11, lines 65 to col. 12, line 22, the cited portions of which are incorporated by reference. Such thiol-terminated polythioethers may be difunctional, that is, linear polymers having two terminal thiol groups, or polyfunctional, that is, branched polymers have three or more terminal thiol groups. Suitable thiol-terminated polythioethers are commercially available, for example, as Permapol® P3.1E, from PRC-DeSoto International Inc., Sylmar, Calif.

In certain embodiments, a thiol-terminated polythioether prepolymer may comprise a mixture of different polythioethers and the polythioethers may have the same or different functionality. In certain embodiments, a thiol-terminated polythioether has an average functionality from 2 to 6, from 2 to 4, from 2 to 3, from 2.05 to 2.8, and in certain embodiments, from 2.05 to 2.5. For example, a thiol-terminated polythioether can be selected from a difunctional thiol-terminated polythioether, a trifunctional thiol-terminated polythioether and a combination thereof.

In certain embodiments, a thiol-terminated polythioether can be prepared by reacting a polythiol and a diene such as a divinyl ether, and the respective amounts of the reactants used to prepare the polythioethers are chosen to yield terminal thiol groups. Thus, in some cases, (n or >n, such as n+1) moles of a polythiol, such as a dithiol or a mixture of at least two different dithiols and about 0.05 moles to 1 moles, such as 0.1 moles to 0.8 moles, of a thiol-terminated polyfunctionalizing agent may be reacted with (n) moles of a diene, such as a divinyl ether, or a mixture of at least two different dienes, such as at least two divinyl ethers. In certain embodiments, a thiol-terminated polyfunctionalizing agent is present in the reaction mixture in an amount sufficient to provide a thiol-terminated polythioether having an average functionality of from 2.05 to 3, such as from 2.1 to 2.8, or from 2.1 to 2.6.

The reaction used to make a thiol-terminated polythioether may be catalyzed by a free radical catalyst. Suitable free radical catalysts include azo compounds, for example azobisnitrile compounds such as azo(bis)isobutyronitrile (AIBN); organic peroxides, such as benzoyl peroxide and t-butyl peroxide; and inorganic peroxides, such as hydrogen peroxide. The reaction can also be effected by irradiation with ultraviolet light either with or without a radical initiator/photosensitizer. Ionic catalysis methods, using either inorganic or organic bases, e.g., triethylamine, may also be used.

Suitable thiol-terminated polythioethers may be produced by reacting a divinyl ether or mixtures of divinyl ethers with an excess of dithiol or a mixtures of dithiols.

Thus, in certain embodiments, a thiol-terminated polythioether comprises the reaction product of reactants comprising:

(a) a dithiol of Formula (3):

$$HS-R^1-SH \qquad (3)$$

wherein,
$R^1$ is selected from $C_{2-6}$ alkanediyl, $C_{6-8}$cycloalkanediyl, $C_{6-10}$ alkanecycloalkanediyl, $C_{5-8}$ heterocycloalkanediyl, and —[—(CHR$^3$)$_s$—X—]$_q$—(CHR$^3$)$_r$—; wherein,
each $R^3$ is independently selected from hydrogen and methyl;
each X is independently selected from —O—, —S—, —NH—, and —NR— wherein R is selected from hydrogen and methyl;
s is an integer from 2 to 6;
q is an integer from 1 to 5; and
r is an integer from 2 to 10; and (b) a divinyl ether of Formula (4):

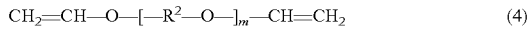

$$CH_2=CH-O-[-R^2-O-]_m-CH=CH_2 \qquad (4)$$

wherein,
each $R^2$ is independently selected from $C_{1-10}$ alkanediyl, $C_{6-8}$cycloalkanediyl, $C_{6-14}$ alkanecycloalkanediyl, and —[(—CHR$^3$)$_s$—X—]$_q$—(—CHR$^3$—)$_r$—, wherein s, q, r, $R^3$, and X are as defined above;
m is an integer from 0 to 50;
n is an integer from 1 to 60; and
p is an integer from 2 to 6.

And, in certain embodiments, the reactants may comprise (c) a polyfunctional compound such as a polyfunctional compound B(—V)$_z$, where B, —V, and z are as defined herein.

In certain embodiments, dithiols suitable for use in preparing thiol-terminated polythioethers include those having Formula (3), other dithiols disclosed herein, or combinations of any of the dithiols disclosed herein. In certain embodiments, a dithiol has the structure of Formula (3):

$$HS-R^1-SH \qquad (3)$$

wherein,
$R^1$ is selected from $C_{2-6}$ alkanediyl, $C_{6-8}$cycloalkanediyl, $C_{6-10}$ alkanecycloalkanediyl, $C_{5-8}$ heterocycloalkanediyl, and —[(CHR$^3$)$_s$—X—]$_q$—(CHR$^3$)$_r$—; wherein,
each $R^3$ is independently selected from hydrogen and methyl;
each X is independently selected from —O—, —S—, and —NR— wherein R is selected from hydrogen and methyl;
s is an integer from 2 to 6;
q is an integer from 1 to 5; and
r is an integer from 2 to 10.

In certain embodiments of a dithiol of Formula (3), $R^1$ is —[—(—CHR$^3$)$_s$—X—]$_q$—(CHR$^3$)$_r$—.

In certain embodiments of a compound of Formula (16), X is selected from —O— and —S—, and thus —[—(CHR$^3$)$_s$—X—]$_q$—(CHR$^3$)$_r$— in Formula (3) is —[(—CHR$^3$—)$_s$—O—]$_q$—(CHR$^3$)$_r$— or —[(—CHR$^3$$_2$—)$_s$—S—]$_q$—(CHR$^3$)$_r$—. In certain embodiments, p and r are equal, such as where p and r are both two.

In certain embodiments of a dithiol of Formula (3), $R^1$ is selected from C$_{2-6}$ alkanediyl and —[—(CHR$^3$)$_s$—X—]$_q$—(CHR$^3$)$_r$—.

In certain embodiments of a dithiol of Formula (3), $R^1$ is —[—(CHR$^3$)$_s$—X—]$_q$—(CHR$^3$)$_r$—, and in certain embodiments X is —O—, and in certain embodiments, X is —S—.

In certain embodiments of a dithiol of Formula (3) where $R^1$ is —[—(CHR$^3$)$_s$—X—]$_q$—(CHR$^3$)$_r$—, s is 2, r is 2, q is 1, and X is —S—; in certain embodiments, wherein s is 2, q is 2, r is 2, and X is —O—; and in certain embodiments, s is 2, r is 2, q is 1, and X is —O—.

In certain embodiments of a dithiol of Formula (3) where $R^1$ is —[—(CHR$^3$)$_s$—X—]$_q$—(CHR$^3$)$_r$—, each $R^3$ is hydrogen, and in certain embodiments, at least one $R^3$ is methyl.

In certain embodiments of Formula (3), each $R^1$ is derived from dimercaptodioxaoctane (DMDO) and in certain embodiments, each $R^1$ is derived from dimercaptodiethylsulfide (DMDS).

In certain embodiments of Formula (3), each m is independently an integer from 1 to 3. In certain embodiments, each m is the same and is 1, 2, and in certain embodiments, 3.

In certain embodiments of Formula (3), n is an integer from 1 to 30, an integer from 1 to 20, an integer from 1 to 10, and in certain embodiments, and an integer from 1 to 5. In addition, in certain embodiments, n may be any integer from 1 to 60.

In certain embodiments of Formula (3), each p is independently selected from 2, 3, 4, 5, and 6. In certain embodiments, each p is the same and is 2, 3, 4, 5, or 6.

Examples of suitable dithiols include, for example, 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide, methyl-substituted dimercaptodiethylsulfide, dimethyl-substituted dimercaptodiethylsulfide, dimercaptodioxaoctane, 1,5-dimercapto-3-oxapentane, and a combination of any of the foregoing. A polythiol may have one or more pendant groups selected from a lower (e.g., C$_{1-6}$) alkyl group, a lower alkoxy group, and a hydroxy group. Suitable alkyl pendant groups include, for example, C$_{1-6}$ linear alkyl, C$_{3-6}$ branched alkyl, cyclopentyl, and cyclohexyl.

Other examples of suitable dithiols include dimercaptodiethylsulfide (DMDS) (in Formula (3), $R^1$ is —[(—CH$_2$—)$_s$—X—]$_q$—(CH$_2$)$_r$—, wherein s is 2, r is 2, q is 1, and X is —S—); dimercaptodioxaoctane (DMDO) (in Formula (3), $R^1$ is —[(—CH$_2$—)$_s$—X—]$_q$—(CH$_2$)$_r$—, wherein s is 2, q is 2, r is 2, and X is —O—); and 1,5-dimercapto-3-oxapentane (in Formula (3), $R^1$ is —[(—CH—)$_s$—X—]$_q$—(CH$_2$)$_r$—, wherein s is 2, r is 2, q is 1, and X is —O—). It is also possible to use dithiols that include both heteroatoms in the carbon backbone and pendant alkyl groups, such as methyl groups. Such compounds include, for example, methyl-substituted DMDS, such as HS—CH$_2$CH(CH$_3$)—S—CH$_2$CH$_2$—SH, HS—CH(CH$_3$)CH$_2$—S—CH$_2$CH$_2$—SH and dimethyl substituted DMDS, such as HS—CH$_2$CH(CH$_3$)—S—CHCH$_3$CH$_2$—SH and HS—CH(CH$_3$)CH$_2$—S—CH$_2$CH(CH$_3$)—SH.

Suitable divinyl ethers for preparing thiol-terminated polythioethers include, for example, divinyl ethers of Formula (4):

$$CH_2=CH-O-(-R^2-O-)_m-CH=CH_2 \quad (4)$$

where $R^2$ in Formula (4) is selected from a C$_{2-6}$ n-alkanediyl group, a C$_{3-6}$ branched alkanediyl group, a C$_{6-8}$cycloalkanediyl group, a C$_{6-10}$ alkanecycloalkanediyl group, and —[(—CH—)$_s$—O—]$_q$—(—CH—)$_r$—, where s is an integer ranging from 2 to 6, q is an integer from 1 to 5, and r is an integer from 2 to 10. In certain embodiments of a divinyl ether of Formula (4), $R^2$ is a C$_{2-6}$ n-alkanediyl group, a C$_{3-6}$ branched alkanediyl group, a C$_{6-8}$cycloalkanediyl group, a C$_{6-10}$ alkanecycloalkanediyl group, and in certain embodiments, —[(—CH$_2$—)$_s$—O—]$_q$—(—CH$_2$—)$_r$—.

Suitable divinyl ethers include, for example, compounds having at least one oxyalkanediyl group, such as from 1 to 4 oxyalkanediyl groups, i.e., compounds in which m in Formula (4) is an integer ranging from 1 to 4. In certain embodiments, m in Formula (4) is an integer ranging from 2 to 4. It is also possible to employ commercially available divinyl ether mixtures that are characterized by a non-integral average value for the number of oxyalkanediyl units per molecule. Thus, m in Formula (4) can also take on rational number values ranging from 0 to 10.0, such as from 1.0 to 10.0, from 1.0 to 4.0, or from 2.0 to 4.0.

Examples of suitable vinyl ethers include, divinyl ether, ethylene glycol divinyl ether (EG-DVE) ($R^2$ in Formula (4) is ethanediyl and m is 1), butanediol divinyl ether (BD-DVE) ($R^2$ in Formula (4) is butanediyl and m is 1), hexanediol divinyl ether (HD-DVE) ($R^2$ in Formula (4) is hexanediyl and m is 1), diethylene glycol divinyl ether (DEG-DVE) ($R^2$ in Formula (4) is ethanediyl and m is 2), triethylene glycol divinyl ether ($R^2$ in Formula (4) is ethanediyl and m is 3), tetraethylene glycol divinyl ether ($R^2$ in Formula (4) is ethanediyl and m is 4), cyclohexanedimethanol divinyl ether, polytetrahydrofuryl divinyl ether; trivinyl ether monomers, such as trimethylolpropane trivinyl ether; tetrafunctional ether monomers, such as pentaerythritol tetravinyl ether; and combinations of two or more such polyvinyl ether monomers. A polyvinyl ether may have one or more pendant groups selected from alkyl groups, hydroxy groups, alkoxy groups, and amine groups.

In certain embodiments, divinyl ethers in which $R^2$ in Formula (4) is C$_{3-6}$ branched alkanediyl may be prepared by reacting a polyhydroxy compound with acetylene. Examples of divinyl ethers of this type include compounds in which $R^2$ in Formula (4) is an alkyl-substituted methanediyl group such as —CH(—CH$_3$)—, for which $R^2$ in Formula (4) is ethanediyl and m is 3 or an alkyl-substituted ethanediyl.

Other useful divinyl ethers include compounds in which $R^2$ in Formula (4) is polytetrahydrofuryl (poly-THF) or polyoxyalkanediyl, such as those having an average of about 3 monomer units.

Two or more types of polyvinyl ether monomers of Formula (4) may be used. Thus, in certain embodiments, two dithiols of Formula (3) and one polyvinyl ether monomer of Formula (4), one dithiol of Formula (3) and two polyvinyl ether monomers of Formula (4), two dithiols of Formula (3) and two divinyl ether monomers of Formula (4), and more than two compounds of one or both Formula (3) and Formula (4), may be used to produce a variety of thiol-terminated polythioethers.

In certain embodiments, a polyvinyl ether monomer comprises 20 to less than 50 mole percent of the reactants used to prepare a thiol-terminated polythioether, and in certain embodiments, 30 to less than 50 mole percent.

In certain embodiments provided by the present disclosure, relative amounts of dithiols and divinyl ethers are selected to yield polythioethers having terminal thiol groups. Thus, a dithiol of Formula (3) or a mixture of at least two different dithiols of Formula (3), can be reacted with of a divinyl ether of Formula (4) or a mixture of at least two different divinyl ethers of Formula (4) in relative amounts such that the molar ratio of thiol groups to alkenyl groups is greater than 1:1, such as from 1.1 to 2.0:1.0.

The reaction between dithiols and divinyl ethers and/or polythiols and polyvinyl ethers may be catalyzed by a free radical catalyst. Suitable free radical catalysts include, for example, azo compounds, for example azobisnitriles such as azo(bis)isobutyronitrile (AIBN); organic peroxides such as benzoyl peroxide and t-butyl peroxide; and inorganic peroxides such as hydrogen peroxide. The catalyst may be a free-radical catalyst, an ionic catalyst, or ultraviolet radiation. In certain embodiments, the catalyst does not comprise acidic or basic compounds, and does not produce acidic or basic compounds upon decomposition. Examples of free-radical catalysts include azo-type catalyst, such as Vazo®-57 (Du Pont), Vazo®-64 (Du Pont), Vazo®-67 (Du Pont), V-70® (Wako Specialty Chemicals), and V-65B® (Wako Specialty Chemicals). Examples of other free-radical catalysts are alkyl peroxides, such as t-butyl peroxide. The reaction may also be effected by irradiation with ultraviolet light either with or without a cationic photoinitiating moiety.

Thiol-terminated polythioethers provided by the present disclosure may be prepared by combining at least one dithiol of Formula (3) and at least one divinyl ether of Formula (4) followed by addition of an appropriate catalyst, and carrying out the reaction at a temperature from 30° C. to 120° C., such as 70° C. to 90° C., for a time from 2 hours to 24 hours, such as 2 hours to 6 hours.

As disclosed herein, thiol-terminated polythioethers may comprise a polyfunctional polythioether, i.e., may have an average functionality of greater than 2.0. Suitable polyfunctional thiol-terminated polythioethers include, for example, those having the structure of Formula (2b):

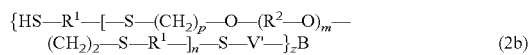   (2b)

wherein z has an average value of greater than 2.0, and, in certain embodiments, a value between 2 and 3, a value between 2 and 4, a value between 3 and 6, and in certain embodiments, is an integer from 3 to 6.

Polyfunctionalizing agents suitable for use in preparing such polyfunctional thiol-terminated polymers include trifunctionalizing agents, that is, compounds where z is 3. Suitable trifunctionalizing agents include, for example, triallyl cyanurate (TAC), 1,2,3-propanetrithiol, isocyanurate-containing trithiols, and combinations thereof, as disclosed in U.S. Publication No. 2010/0010133 at paragraphs [0102]-[0105], the cited portion of which is incorporated by reference and isocyanurates as disclosed, for example, in U.S. Application Publication No. 2011/0319559, which is incorporated by reference in its entirety. Other useful polyfunctionalizing agents include trimethylolpropane trivinyl ether, and the polythiols described in U.S. Pat. Nos. 4,366,307; 4,609,762; and 5,225,472, each of which is incorporated by reference in its entirety. Mixtures of polyfunctionalizing agents may also be used. As a result, polythioethers provided by the present disclosure may have a wide range of average functionality. For example, trifunctionalizing agents may afford average functionalities from 2.05 to 3.0, such as from 2.1 to 2.6. Wider ranges of average functionality may be achieved by using tetrafunctional or higher functionality polyfunctionalizing agents. Functionality may also be determined by factors such as stoichiometry, as will be understood by those skilled in the art.

Antioxidant

Compositions and sealants provided by the present disclosure include at least one antioxidant.

Suitable antioxidants have low solubility and/or are not excessively extracted by Jet Reference Fluid Type I. In certain embodiments, a suitable antioxidant is a sterically hindered phenolic antioxidant such as, for example pentaerythrityl tetrakis[3-(3,5-di-tert-butyl-4-hydroxyphenyl)propionate] (Irganox® 1010, BASF).

In certain embodiments, a suitable antioxidant is chemically and/or physically bound to a carrier. In such embodiments, the antioxidant may have high solubility in JRF Type I but when bound to the carrier has low solubility in JRF Type I. An example of a suitable carrier-bound antioxidant is Agerite® Superlite® solid powder, which is a polybutylated bisphenol A bound to an inert carrier.

In certain embodiments, a suitable antioxidant may have a solubility in JRF Type I that is about the same as that of Irganox® 1010 or less than the solubility of Irganox® 1010 in JRF Type I. In certain embodiments, a suitable phenolic antioxidant may include sterically hindered phenolic antioxidant such as, for example, pentaerythrityl tetrakis[3-(3,5-di-tert-butyl-4-hydroxyphenyl)propionate](Irganox® 1010, BASF), triethylene glycol bis[3-(3-tert-butyl-4-hydroxy-5-methylphenyl)propionate](Irganox® 245, BASF), 3,3'-bis[3-(3,5-di-tert-butyl-4-hydroxyphenyl)propionohydrazide](Irganox® MD 1024, BASF), hexamethylene glycol bis[3-(3,5-di-tert-butyl-4-hydroxyphenyl)propionate](Irganox® 259, BASF), and 3,5-di-tert-butyl-4-hydroxytoluene (Lowinox BHT, Chemtura). In certain embodiments, a phenolic antioxidant includes Irganox® 1010, i.e., pentaerythritol tetrakis (3-(3,5-di-tert-butyl-4-hydroxyphenyl)propionate.

In certain embodiments a composition includes from about 0.5 wt % to about 5 wt %, from about 0.5 wt % to about 4 wt %, or from about 0.75 wt % to about 3 wt % of the composition, where wt % is based on the total weight of the composition.

In certain embodiments a sealant formulation includes from 0.5 wt % to about 5 wt %, from about 0.5 wt % to about 4 wt %, from about 0.75 wt % to about 3 wt %, or from 0.5 wt % to about 2.5 wt % of the composition, where wt % is based on the total weight of the composition.

In certain embodiments, a cured sealant provided by the present disclosure that include a phenolic antioxidant exhibits enhanced high temperature tensile strength and an elongation value as compared to that of a corresponding cured sealant without the phenolic antioxidant. For example, in certain embodiments, a cured sealant that includes a phenolic antioxidant exhibits a decrease in elongation following exposure to 300° F. for seven (7) days of less than 35%, less than 25%, less than 20%, less than 15% and in certain embodiments, less than 10%, compared to the initial elongation.

In certain embodiments, following exposure to a temperature of 300° F. for seven (7) days or to a temperature of 400° F. for six (6) hours the elongation of the cured sealant is at least 90%, at least 100%, at least 100%, at least 120%, or in certain embodiments, at least 130%.

In certain embodiments, an antioxidant is added to the composition as a liquid. In certain embodiments, an antioxidant is dissolved in a suitable solvent before being added to a composition. For example, Irganox® 1010 may be dissolved in acetone and the solution then may be added to and mixed with other components of a sealant composition. Other suitable solvents may be used. In certain embodiments, a suitable solvent will evaporate from a sealant composition while the sealant composition is curing.

In certain embodiments, an antioxidant is not bound to a carrier such as an inert powder.

Polyepoxy

In certain embodiments, compositions provided by the present disclosure comprise a polyepoxy curing agent. Examples of suitable polyepoxy curing agents include, for example, polyepoxide resins such as hydantoin diepoxide, diglycidyl ether of bisphenol-A, diglycidyl ether of bisphenol-F, Novolac® type epoxides such as DEN™ 438, certain epoxidized unsaturated resins, and combinations of any of the foregoing. A polyepoxide refers to a compound having two or more reactive epoxy groups.

In certain embodiments, a polyepoxy comprises a polyepoxy selected from a Novolac® epoxy resin such as DEN® 431, a bisphenol A/epichlorohydrin derived epoxy resin such as EPON® 828, or a combination thereof.

Catalyst

Compositions provided by the present disclosure may include one or more catalysts. A catalyst can be selected as appropriate for the curing chemistry employed. In certain embodiments, for example, when curing thiol-terminated bis(sulfonyl)alkanol-containing polythioethers or prepolymers and polyepoxides, the catalyst can be an amine catalyst. A cure catalyst may be present, for example, in an amount from 0.1 to 5 weight percent, based on the total weight of the composition. Examples of suitable catalysts include 1,4-diazabicyclo[2.2.2]octane (DABCO®, commercially available from Air Products, Chemical Additives Division, Allentown, Pa.) and DMP-30® (an accelerant composition including 2,4,6-tris(dimethylaminomethyl)phenol. Other examples of suitable amine catalysts include, for example, triethylenediamine (1,4-diazabicyclo[2.2.2]octane, DABCO), dimethylcyclohexylamine (DMCHA), dimethylethanolamine (DMEA), bis-(2-dimethylaminoethyl)ether, N-ethylmorpholine, triethylamine, 1,8-diazabicyclo[5.4.0]undecene-7 (DBU), pentamethyldiethylenetriamine (PMDETA), benzyldimethylamine (BDMA), N,N,N'-trimethyl-N'-hydroxyethyl-bis(aminoethyl)ether, and N'-(3-(dimethylamino)propyl)-N,N-dimethyl-1,3-propanediamine.

Other Components

Compositions provided by the present disclosure may comprise one or more additional components suitable for use in aerospace sealants and depend at least in part on the desired performance characteristics of the cured sealant under conditions of use.

In certain embodiments, a composition provided by the present disclosure comprises an ethylenically unsaturated silane, such as, for example, a sulfur-containing ethylenically unsaturated silane, which can improve the adhesion of a cured sealant to a metal substrate. As used herein, the term sulfur-containing ethylenically unsaturated silane refers to a molecular compound that comprises, within the molecule, (i) at least one sulfur (S) atom, (ii) at least one, in some cases at least two, ethylenically unsaturated carbon-carbon bonds, such as a carbon-carbon double bonds (C=C); and (iii) at least one silane group, —Si(—R)$_m$(—OR)$_{3-m}$, where each R is independently selected from hydrogen, alkyl, cycloalkyl, aryl, and others, and m is selected from 0, 1, and 2. Examples of ethylenically unsaturated silanes are disclosed in U.S. Publication No. 2012/0040104, which is incorporated by reference in its entirety.

In certain embodiments, compositions provided by the present disclosure comprise one or more than one adhesion promoters. A one or more additional adhesion promoter may be present in amount from 0.1 wt % to 15 wt % of a composition, less than 5 wt %, less than 2 wt %, and in certain embodiments, less than 1 wt %, based on the total dry weight of the composition. Examples of adhesion promoters include phenolics, such as Methylon® phenolic resin, and organosilanes, such as epoxy, mercapto or amino functional silanes, such as Silquest® A-187 and Silquest® A-1100. Other useful adhesion promoters are known in the art. In certain embodiments, the adhesion promoter includes T-1601, available from PRC-DeSoto International.

Compositions provided by the present disclosure may comprise one or more different types of filler. Suitable fillers include those commonly known in the art, including inorganic fillers, such as carbon black and calcium carbonate (CaCO$_3$), silica, polymer powders, and lightweight fillers. Suitable lightweight fillers include, for example, those described in U.S. Pat. No. 6,525,168. In certain embodiments, a composition includes 5 wt % to 60 wt % of the filler or combination of fillers, 10 wt % to 50 wt %, and in certain embodiments, from 20 wt % to 40 wt %, based on the total dry weight of the composition. Compositions provided by the present disclosure may further include one or more colorants, thixotropic agents, accelerators, fire retardants, adhesion promoters, solvents, masking agents, or a combination of any of the foregoing. As can be appreciated, fillers and additives employed in a composition may be selected so as to be compatible with each other as well as the polymeric component, curing agent, and or catalyst.

In certain embodiments, compositions provided by the present disclosure include low density filler particles. As used herein, low density, when used with reference to such particles means that the particles have a specific gravity of no more than 0.7, in certain embodiments no more than 0.25, and in certain embodiments, no more than 0.1. Suitable lightweight filler particles often fall within two categories—microspheres and amorphous particles. The specific gravity of microspheres may range from 0.1 to 0.7 and include, for example, polystyrene foam, microspheres of polyacrylates and polyolefins, and silica microspheres having particle sizes ranging from 5 microns to 100 microns and a specific gravity of 0.25 (Eccospheres®). Other examples include alumina/silica microspheres having particle sizes in the range of 5 microns to 300 microns and a specific gravity of 0.7 (Fillite®), aluminum silicate microspheres having a specific gravity of from about 0.45 to about 0.7 (Z-Light®), calcium carbonate-coated polyvinylidene copolymer microspheres having a specific gravity of 0.13 (Dualite® 6001AE), and calcium carbonate coated acrylonitrile copolymer microspheres such as Dualite® E135, having an average particle size of about 40 μm and a density of 0.135 g/cc (Henkel). Suitable fillers for decreasing the specific gravity of the composition include, for example, hollow microspheres such as Expancel® microspheres (available from AkzoNobel) or Dualite® low density polymer microspheres (available from Henkel). In certain embodiments, compositions provided by the present disclosure include lightweight filler particles comprising an exterior surface coated with a thin coating, such as those described in U.S. Publication No. 2010/0041839 at paragraphs [0016]-[0052], the cited portion of which is incorporated herein by reference.

In certain embodiments, a low density filler comprises less than 2 wt % of a composition, less than 1.5 wt %, less than 1.0 wt %, less than 0.8 wt %, less than 0.75 wt %, less than 0.7 wt % and in certain embodiments, less than 0.5 wt % of a composition, where wt % is based on the total dry solids weight of the composition.

In certain embodiments, compositions provided by the present disclosure comprise at least one filler that is effective in reducing the specific gravity of the composition. In certain embodiments, the specific gravity of a composition is from 0.8 to 1, from 0.7 to 0.9, from 0.75 to 0.85, and in certain embodiments, is about 0.8. In certain embodiments, the specific gravity of a composition is less than about 0.9, less than about 0.8, less than about 0.75, less than about 0.7, less than about 0.65, less than about 0.6, and in certain embodiments, less than about 0.55.

A composition may also include any number of additives as desired. Examples of suitable additives include plasticizers, pigments, surfactants, adhesion promoters, thixotropic agents, fire retardants, masking agents, and accelerators (such as amines, including 1,4-diaza-bicyclo[2.2.2]octane, DABCO®), and combinations of any of the foregoing. When used, the additives may be present in a composition in an amount ranging, for example, from about 0 wt % to 60 wt %. In certain embodiments, additives may be present in a composition in an amount ranging from about 25 wt % to 60 wt %.

Uses

Compositions provided by the present disclosure may be used, for example, in sealants, coatings, encapsulants, and potting compositions. A sealant includes a composition capable of producing a film that has the ability to resist operational conditions, such as moisture and temperature, and at least partially block the transmission of materials, such as water, fuel, and other liquid and gases. A coating composition includes a covering that is applied to the surface of a substrate to, for example, improve the properties of the substrate such as the appearance, adhesion, wettability, corrosion resistance, wear resistance, fuel resistance, and/or abrasion resistance. A potting composition includes a material useful in an electronic assembly to provide resistance to shock and vibration and to exclude moisture and corrosive agents. In certain embodiments, sealant compositions provided by the present disclosure are useful, e.g., as aerospace sealants and as linings for fuel tanks.

In certain embodiments, compositions containing thiol-terminated polythioether prepolymers are formulated as sealants.

In certain embodiments, compositions, such as sealants, may be provided as multi-pack compositions, such as two-pack compositions, wherein one package comprises one or more thiol-terminated polythioethers provided by the present disclosure and a second package comprises one or more polyfunctional Michael acceptor-terminated urethane-containing prepolymers provided by the present disclosure. Additives and/or other materials may be added to either package as desired or necessary. The two packages may be combined and mixed prior to use. In certain embodiments, the pot life of the one or more mixed thiol-terminated polythioethers and epoxies is at least 30 minutes, at least 1 hour, at least 2 hours, and in certain embodiments, more than 2 hours, where pot life refers to the period of time the mixed composition remains suitable for use as a sealant after mixing.

Compositions, including sealants, provided by the present disclosure may be applied to any of a variety of substrates. Examples of substrates to which a composition may be applied include metals such as titanium, stainless steel, and aluminum, any of which may be anodized, primed, organic-coated or chromate-coated; epoxy; urethane; graphite; fiberglass composite; Kevlar®; acrylics; and polycarbonates. In certain embodiments, compositions provided by the present disclosure may be applied to a coating on a substrate, such as a polyurethane coating.

Compositions provided by the present disclosure may be applied directly onto the surface of a substrate or over an underlayer by any suitable coating process.

Furthermore, methods are provided for sealing an aperture utilizing a composition provided by the present disclosure. These methods comprise, for example, applying a composition provided by the present disclosure to a surface to seal an aperture, and curing the composition. In certain embodiments, a method for sealing an aperture comprises applying a sealant composition provided by the present disclosure to surfaces defining an aperture and curing the sealant, to provide a sealed aperture.

In certain embodiments, a composition may be cured under ambient conditions, where ambient conditions refers to a temperature from 20° C. to 25° C., and atmospheric humidity. In certain embodiments, a composition may be cured under conditions encompassing a temperature from a 0° C. to 100° C. and humidity from 0% relative humidity to 100% relative humidity. In certain embodiments, a composition may be cured at a higher temperature such as at least 30° C., at least 40° C., and in certain embodiments, at least 50° C. In certain embodiments, a composition may be cured at room temperature, e.g., 25° C. In certain embodiments, a composition may be cured upon exposure to actinic radiation, such as ultraviolet radiation. As will also be appreciated, the methods may be used to seal apertures on aerospace vehicles including aircraft and aerospace vehicles.

In certain embodiments, the composition achieves a tack-free cure in less than about 2 hours, less than about 4 hours, less than about 6 hours, less than about 8 hours, and in certain embodiments, less than about 10 hours, at a temperature of less than about 200° F.

The time to form a viable seal using curable compositions of the present disclosure can depend on several factors as can be appreciated by those skilled in the art, and as defined by the requirements of applicable standards and specifications. In general, curable compositions of the present disclosure develop adhesion strength within 24 hours to 30 hours, and 90% of full adhesion strength develops from 2 days to 3 days, following mixing and application to a surface. In general, full adhesion strength as well as other properties of cured compositions of the present disclosure becomes fully developed within 7 days following mixing and application of a curable composition to a surface.

Properties

For aerospace sealant applications it can be desirable that a sealant meet the requirements of Mil-S-22473E (Sealant Grade C) at a cured thickness of 20 mils, exhibit an elongation greater than 200%, a tensile strength greater than 250 psi, and excellent fuel resistance, and maintain these properties over a wide temperature range from −67° F. to 360° F. In general, the visual appearance of the sealant is not an important attribute. Prior to cure, it is desirable that the mixed components have a useful working time or pot life of at least 24 hours and have a cure time within 24 hours of the pot life. Useful working time or pot life refers to the time period the composition remains workable for application at ambient temperatures after the catalyst is released. In certain embodiments, compositions provided by the present disclosure, following release of the catalytic amine, have a pot life of at least 6 hours, at least 12 hours, at least 18 hours, at least 24 hours, and in certain embodiments, more than 24 hours. In certain embodiments, compositions provided by the present disclosure cure in less than 6 hours after the pot life, in less than 12 hours, in less than 18 hours, in less than 24 hours, in less than 48 hours, and in certain embodiments, in less than 72 hours after useful working time.

Cured compositions disclosed herein, such as cured sealants, exhibit properties acceptable for use in aerospace applications. In general, it is desirable that sealants used in aviation and aerospace applications exhibit the following properties: peel strength greater than 20 pounds per linear inch (pli) on Aerospace Material Specification (AMS) 3265B substrates determined under dry conditions, following immersion in JRF Type I for 7 days, and following immersion in a solution of 3% NaCl according to AMS 3265B test specifications; tensile strength between 300 pounds per square inch (psi) and 400 psi; tear strength greater than 50 pounds per linear inch (pli); elongation between 250% and 300%; and hardness greater than 40 Durometer A. These and other cured sealant properties appropriate for aviation and aerospace applications are disclosed in AMS 3265B, the entirety of which is incorporated by reference. It is also desirable that, when cured, compositions of the present disclosure used in aviation and aircraft applications exhibit a percent volume swell not greater than 25% following immersion for one week at 60° C. (140° F.) and ambient pressure in JRF Type I. Other properties, ranges, and/or thresholds may be appropriate for other sealant applications.

In certain embodiments, therefore, compositions provided by the present disclosure are fuel-resistant. As used herein, the term "fuel resistant" means that a composition, when applied to a substrate and cured, can provide a cured product, such as a sealant, that exhibits a percent volume swell of not greater than 40%, in some cases not greater than 25%, in some cases not greater than 20%, in yet other cases not more than 10%, after immersion for one week at 140° F. (60° C.) and ambient pressure in Jet Reference Fluid (JRF) Type I according to methods similar to those described in ASTM D792 (American Society for Testing and Materials) or AMS 3269 (Aerospace Material Specification). Jet Reference Fluid JRF Type I, as employed for determination of fuel resistance, has the following composition: toluene: 28%±1% by volume; cyclohexane (technical): 34%±1% by volume; isooctane: 38%±1% by volume; and tertiary dibutyl disulfide: 1%±0.005% by volume (see AMS 2629, issued Jul. 1, 1989, §3.1.1 etc., available from SAE (Society of Automotive Engineers)).

In certain embodiments, compositions provided herein provide a cured product, such as a sealant, exhibiting a tensile elongation of at least 100% and a tensile strength of at least 400 psi when measured in accordance with the procedure described in AMS 3279, §3.3.17.1, test procedure AS5127/1, §7.7.

In certain embodiments, a cured sealant comprising a composition provided by the present disclosure meets or exceeds the requirements for aerospace sealants as set forth in AMS 3277.

Apertures, including apertures of aerospace vehicles, sealed with compositions provided by the present disclosure are also disclosed.

EXAMPLES

Embodiments provided by the present disclosure are further illustrated by reference to the following examples, which describe compositions and sealants provided by the present disclosure. It will be apparent to those skilled in the art that many modifications, both to materials, and methods, may be practiced without departing from the scope of the disclosure.

Example 1

Comparative Sealant Formulation

A comparative sealant formulation consisted of two parts, a base and an accelerator. The components for the base formulation are shown in Table 1 and for the accelerator composition in Table 2.

TABLE 1

| Base Composition of Comparative Example 1 | |
|---|---|
| Composition | Weight, g |
| Adhesion Promoter* | 0.97 |
| Silica | 1.46 |
| Calcium carbonate | 53.5 |
| Aluminum hydroxide | 9.73 |
| Tetra N-butyl titanate | 0.49 |
| Titanium dioxide | 0.97 |
| Phenolic resin | 1.46 |
| Permapol ® 3.1E prepolymer** | 107 |
| Silane, Silquest ® A-1100 | 0.2 |
| Tung oil | 1.41 |
| DABCO ® 33-LV | 1.05 |

*Adhesion promoter T-3920; available from PRC-DeSoto International, Inc.
**Permapol ® 3.1E prepolymer; available from PRC-DeSoto International, Inc.

TABLE 2

| Accelerator Composition of Comparative Example 1 | |
|---|---|
| Composition | Weight, g |
| Adhesion Promoter* | 5.7 |
| Calcium carbonate | 50.4 |
| Plasticizer | 40 |
| Carbon black | 24 |
| Epoxy Resin, DEN ® 431 | 50 |
| Epoxy Resin, EPON ® 828 | 50 |

*Adhesion promoter T-1601; available from PRC-DeSoto International, Inc.

The base and accelerator compositions were separately prepared and mixed, and the separate mixtures were kept at room temperature for twenty-four (24) hours before combining.

A sealant was prepared by mixing 100 g of the base with 18.5 g of the accelerator. Tensile strength and elongation samples were prepared according to Section 7.7 of SAE Aerospace Standard AS5127/1B, published by SAE International Group. The test samples were allowed to cure and then exposed to either Exposure Condition 1 or Exposure Condition 2:

Exposure Condition 1: Cured at ambient conditions for 14 days, followed by 140° F. JRF Type I exposure for 72 hours; followed by 120° F. air exposure for 72 hours; and finally 300° F. air exposure for 7 days.

Exposure Condition 2: Cured at ambient conditions for 14 days, followed by 400° F./6 hours air exposure.

The tensile strength and elongation were measured according to ASTM D412C after the samples were cooled to room temperature. The results are reported in Table 11.

Example 2

Sealant Formulation

A sealant formulation consisted of two parts, a base and an accelerator. The components of the base formulation are shown in Table 3 and of the accelerator composition in Table 4.

TABLE 3

Base Composition of Example 2

| Composition | Weight, g |
|---|---|
| Adhesion Promoter* | 0.97 |
| Silica | 1.46 |
| Calcium carbonate | 53.5 |
| Aluminum hydroxide | 9.73 |
| Tetra N-butyl titanate | 0.49 |
| Titanium dioxide | 0.97 |
| Phenolic resin | 1.46 |
| Permapol ® 3.1E prepolymer** | 107 |
| Silane, , Silquest ® A-1100 | 0.2 |
| Tung oil | 1.41 |
| DABCO ® 33-LV | 1.05 |
| Agerite ® Superlite ® S | 2.85 |

*Adhesion promoter T-3920; available from PRC-DeSoto International, Inc.
**Permapol ® 3.1E prepolymer; available from PRC-DeSoto International, Inc.

TABLE 4

Accelerator Composition of Example 2

| Composition | Weight, g |
|---|---|
| Adhesion Promoter* | 5.7 |
| Calcium carbonate | 50.4 |
| Plasticizer | 40 |
| Carbon black | 24 |
| Epoxy Resin, DEN ® 431 | 0.5 |
| Epoxy Resin, EPON ® 828 | 50 |

*Adhesion promoter T-1601; available from PRC-DeSoto International, Inc.

The base and accelerator compositions were separately prepared and mixed, the mixtures were kept at room temperature for twenty-four (24) hours before combining.

A sealant was prepared by mixing 100 g of the base with 18.5 g of the accelerator. Tensile strength and elongation test samples were prepared according to Section 7.7 of SAE Aerospace Standard AS5127/1B, published by SAE International Group. The samples were allowed to cure and were exposed to Exposure Condition 1.

The tensile strength and elongation were measured according to ASTM D412C after the samples were cooled to room temperature and the results are reported in Table 11.

Example 3

Sealant Formulation

A sealant formulation consisted of two parts, a base and an accelerator. The components of the base formulation are shown in Table 5 and of the accelerator composition in Table 6.

TABLE 5

Base Composition of Example 3

| Composition | Weight, g |
|---|---|
| Adhesion Promoter* | 0.97 |
| Silica | 1.46 |
| Calcium carbonate | 53.5 |
| Aluminum hydroxide | 9.73 |
| Tetra N-butyl titanate | 0.49 |
| Titanium dioxide | 0.97 |
| Phenolic resin | 1.46 |
| Permapol ® 3.1E prepolymer** | 107 |
| Silane, Silquest ® A-1100 | 0.2 |
| Tung oil | 1.41 |
| DABCO ® 33-LV | 1.05 |
| Acetone | 6.52 |
| Irganox ® 1010 | 5.34 |

*Adhesion promoter T-3920 is available from PRC-DeSoto International, Inc.
**Permapol polymer is available from PRC-DeSoto International, Inc.

Irganox® 1010 was first pre-mixed with acetone, and then mixed with the rest of components. The mixture was maintained at room temperature for 24 hours before mixing with the accelerator.

TABLE 6

Accelerator Composition of Example 3

| Composition | Weight, g |
|---|---|
| Adhesion Promoter* | 5.7 |
| Calcium carbonate | 50.4 |
| Plasticizer | 40 |
| Carbon black | 24 |
| Epoxy Resin, DEN ® 431 | 0.5 |
| Epoxy Resin, EPON ® 828 | 50 |

*Adhesion promoter T-1601, available from PRC-DeSoto International, Inc.

The components of the accelerator were mixed and the mixture kept at room temperature for 24 hours before combining with the base.

A sealant was prepared by mixing 100 g of the base with 18.5 g of the accelerator. Tensile strength and elongation samples were prepared according to Section 7.7 of SAE Aerospace Standard AS5127/1B, published by SAE International Group. The samples were allowed to cure and then exposed to either Exposure Condition 1 or to Exposure Condition 2.

The tensile strength and elongation of the test samples were measured according to ASTM D412C after the samples were cooled to room temperature. The results are reported in Table 11.

Example 4

Sealant Formulation

A sealant formulation consisted of two parts, a base and an accelerator. The components for the base formulation are shown in Table 7 and for the accelerator composition in Table 8.

TABLE 7

Base Composition of Example 4

| Composition | Weight, g |
|---|---|
| Adhesion Promoter* | 0.97 |
| Silica | 1.46 |
| Calcium carbonate | 53.5 |

TABLE 7-continued

Base Composition of Example 4

| Composition | Weight, g |
|---|---|
| Aluminum hydroxide | 9.73 |
| Tetra N-butyl titanate | 0.49 |
| Titanium dioxide | 0.97 |
| Phenolic resin | 1.46 |
| Permapol ® 3.1E prepolymer** | 107 |
| Silane, Silquest ® A-1100 | 0.2 |
| Tung oil | 1.41 |
| DABCO 33-LV | 1.05 |
| Irganox ® 1010 | 1.78 |

*Adhesion promoter T-3920, available from PRC-DeSoto International, Inc.
**Permapol ® polymer is available from PRC-DeSoto International, Inc.

TABLE 8

Accelerator Composition of Example 4

| Composition | Weight, g |
|---|---|
| Adhesion Promoter* | 5.7 |
| Calcium carbonate | 50.4 |
| Plasticizer | 40 |
| Carbon black | 24 |
| Epoxy Resin, DEN ® 431 | 0.5 |
| Epoxy Resin, EPON ® 828 | 50 |

*Adhesion promoter T-1601, available from PRC-DeSoto International, Inc.

The components of the base composition were intimately mixed and the mixture was kept at room temperature for 24 hours before mixing with the accelerator.

A sealant was prepared by mixing 100 g of the base with 18.5 g of the accelerator. Tensile strength and elongation samples were prepared according to Section 7.7 of SAE Aerospace Standard AS5127/1B, published by SAE International Group. The samples were allowed to cure and then exposed to either Exposure Condition 1 or to Exposure Condition 2.

The tensile strength and elongation of the test samples were measured according to ASTM D412C after the samples were cooled to room temperature. The results are reported in Table 11.

Comparative Example 5

Comparative Sealant Formulation

A sealant formulation consisted of two parts, a base and an accelerator. The components of the base formulation are listed in Table 9 and of the accelerator composition in Table 10.

TABLE 9

Base Composition of Comparative Example 5.

| Composition | Weight, g |
|---|---|
| Adhesion Promoter* | 0.97 |
| Silica | 1.46 |
| Calcium carbonate | 53.5 |
| Aluminum hydroxide | 9.73 |
| Tetra N-butyl titanate | 0.49 |
| Titanium dioxide | 0.97 |
| Phenolic resin | 1.46 |
| Permapol ® 3.1E prepolymer** | 107 |
| Silane, Silquest A-1100 | 0.2 |
| Tung oil | 1.41 |

TABLE 9-continued

Base Composition of Comparative Example 5.

| Composition | Weight, g |
|---|---|
| DABCO ® 33-LV | 1.05 |
| Ethyl Acetate | 6.52 |
| Irganox ® 1076 | 5.34 |

*Adhesion promoter, T-3920, is available from PRC-DeSoto International, Inc.
**Permapol polymer is available from PRC-DeSoto International, Inc.

Irganox® 1076 was first pre-mixed with ethyl acetate, and then combined with the other components. The mixture was maintained at room temperature for 24 hours before mixing with the accelerator.

TABLE 10

Accelerator Composition of Comparative Example 5.

| Composition | Weight, g |
|---|---|
| Adhesion Promoter* | 5.7 |
| Calcium carbonate | 50.4 |
| Plasticizer | 40 |
| Carbon black | 24 |
| Epoxy Resin, DEN ® 431 | 0.5 |
| Epoxy Resin, EPON ® 828 | 50 |

*Adhesion promoter T-1601, available from PRC-DeSoto International, Inc.

The base and accelerator compositions were separately prepared and mixed, the mixtures were kept at room temperature for twenty-four (24) hours before combining.

A sealant was prepared by mixing 100 g of the base with 18.5 g of the accelerator. Tensile strength and elongation samples were prepared according to Section 7.7 of SAE Aerospace Standard AS5127/1B, published by SAE International Group. The samples were allowed to cure and were then exposed to Exposure Condition 1 or Exposure Condition 2. Unexposed samples were also tested.

The tensile strength and elongation were measured according to ASTM D412C after the samples were cooled to room temperature. The results are presented in Table 11.

TABLE 11

Results

| Example Identification | Unexposed Tensile Strength psi | Unexposed Elongation % | Exposure Condition 1 JRF/ high temperature Tensile Strength psi | Exposure Condition 1 JRF/ high temperature Elongation % | Exposure Condition 2 high temperature Tensile Strength psi | Exposure Condition 2 high temperature Elongation % |
|---|---|---|---|---|---|---|
| Comparative Example 1 | 481 | 464 | 165 | 54 | 100 | 57 |
| Example 2 | 375 | 328 | 230 | 80 | 125 | 135 |
| Example 3 | 431 | 415 | 259 | 80 | 149 | 121 |
| Example 4 | 417 | 346 | 270* | 144* | 147 | 100 |
| Comparative Example 5 | 400 | 481 | 94* | 39* | 91 | 42 |

*Data was taken after curing the sample at room temperature for 14 days, followed by exposure to 300° F. air for 7 days.

Finally, it should be noted that there are alternative ways of implementing the embodiments disclosed herein. Accordingly, the present embodiments are to be considered as illustrative and not restrictive. Furthermore, the claims are not to be limited to the details given herein, and are entitled their full scope and equivalents thereof.

What is claimed is:

1. The composition, comprising:
a thiol-terminated polythioether preploymer, wherein the thiol-terminated polythioether prepolymer is selected from a thiol-terminated polythioether prepolymer of Formula (2a), a thiol-terminated polythioether prepolymer of Formula (2b), and a combination thereof:

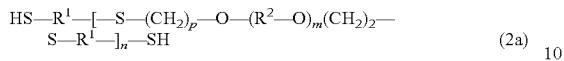  (2a)

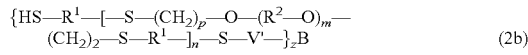  (2b)

wherein,
each $R^1$ independently is selected from $C_{2-10}$ alkanediyl, $C_{6-8}$ cycloalkanediyl, $C_{6-14}$ alkanecycloalkanediyl, $C_{5-8}$ heterocycloalkanediyl, and $-[(-CHR^3-)_s-X-]_q-(-CHR^3-)_r-$, wherein,
s is an integer from 2 to 6;
q is an integer from 1 to 5;
r is an integer from 2 to 10;
each $R^3$ is independently selected from hydrogen and methyl; and
each X is independently selected from $-O-$, $-S-$, and $-NR-$, wherein R is selected from hydrogen and methyl;
each $R^2$ is independently selected from $C_{1-10}$ alkanediyl, $C_{6-8}$ cycloalkanediyl, $C_{6-14}$ alkanecycloalkanediyl, and $-[(-CHR^3-)_s-X-]_q-(-CHR^3-)_r-$, wherein s, q, r, $R^3$, and X are as defined as for $R^1$;
m is an integer from 0 to 50;
n is an integer from 1 to 60;
p is an integer from 2 to 6;
B represents a core of a z-valent, polyfunctionalizing agent $B(-V)_z$ wherein,
z is an integer from 3 to 6; and
each V is a moiety comprising a terminal group reactive with a thiol; and
each $-V'-$ is derived from the reaction of $-V-$ with a thiol;
a ployepoxy curing agent, wherein the ployepoxy curing agent comprises a noxloac-type epoxy resin, a bisphenol A/epichlorohydrin derived epoxy resin, or a combination thereof; and
an antioxidant comprising pentaerythritol tetrakis(3-(3,5-di-tert-butyl-4-hydroxyphenyl)propionate;
a catalyst;
a filler; and
an adhesion promoter;
wherein the composition comprises:
from 0.5 wt % to 5 wt % of the antioxidant
from 0.1 wt % to 5 wt % of the catalyst;
from 5 wt % 60 wt % of the filler; and
from 0.1 wt % to 15 wt % of the adhesion promoter, wherein wt % is based on the total weight of the composition.

2. The composition of claim 1, wherein the thiol-terminated polythioether prelopymer comprises the reaction product of reactants comprising:
(a) a dithiol of Formula (3):

HS—$R^1$—SH  (3)

wherein,
$R^1$ is selected from $C_{2-6}$ alkanediyl, $C_{6-8}$ cycloalkanediyl, $C_{6-10}$ alkanecycloalkanediyl, $C_{5-8}$ heterocycloalkanediyl, and $-[-(CHR^3)_s-X-]_q-(CHR^3)_r$; wherein, each $R^3$ is independently selected from hydrogen and methyl;
each X is independently selected from $-O-$, $-S-$, $-NH-$, and $-NR-$ wherein R is selected from hydrogen and methyl;
s is an integer from 2 to 6;
q is an integer from 1 to 5; and
r is an integer from 2 to 10; and
(b) a divinyl ether of Formula (4):

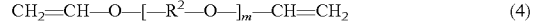  (4)

wherein,
each $R^2$ is independently selected from $C_{1-10}$ alkanediyl, $C_{6-8}$ cycloalkanediyl, $C_{6-14}$ alkanecycloalkanediyl, and $-[(-CHR^3-)_s-X-]_q-(-CHR^3-)_r-$, wherein s, q, r, $R^3$, and X are as defined above;
m is an integer from 0 to 50;
n is an integer from 1 to 60; and
p is an integer from 2 to 6.

3. The composition of claim 2, wherein the reactants comprise (c) a polyfunctional compound having the formula $B(-V)_z$, wherein,
B represents a core of the z-valent polyfunctional compound;
z is an integer from 3 to 6; and
each V is a moiety comprising a terminal group reactive with a thiol.

4. The composition of claim 1, formulated as a sealant.

5. A cured sealant prepared using the composition of claim 4.

6. The cured sealant of claim 5, wherein,
the cured sealant is characterized by an initial elongation; and
following exposure to (a) Jet Reference Fluid Type 1 at 140° F. for 72 hours; (b) 120° F. air for 72 hours; and (c) 330° F. for 7 days the initial elongation decreases by less the 35%.

7. A method of sealing one or more surfaces, comprising:
applying the composition of claim 4 to one or more surfaces; and
curing the composition to seal the one or more surfaces.

8. The composition of claim 1, wherein,
$R^1$ is $-[(-CH_2-)_s-X-]_q-(CH_2)_r-$, wherein s is 2, X is $-O-$, q is 2, r is 2;
$R^2$ is ethanediyl; and
m is 2.

9. A composition comprising:
a thiol-terminated polythioether selected from the group consisting of a thiol-terminated polythioether of Formula (2a), a thiol-terminated polythioether of Formula (2b), and a combination thereof:

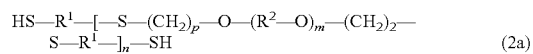  (2a)

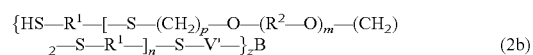  (2b)

wherein,
each $R^1$ independently is selected from $C_{2-10}$ alkanediyl, $C_{6-8}$ cycloalkanediyl, $C_{6-14}$ alkanecycloalkanediyl, $C_{5-8}$ heterocycloalkanediyl, and $-[(-CHR^3-)_s-X-]_q-(-CHR^3-)_r-$, wherein,
s is an integer from 2 to 6;
q is an integer from 1 to 5;
r is an integer from 2 to 10;
each $R^3$ is independently selected from hydrogen and methyl; and each X is independently selected from —O—, —S—, and —NR—, wherein R is selected from hydrogen and methyl;

each $R^2$ is independently selected from $C_{1-10}$ alkanediyl, $C_{6-8}$ cycloalkanediyl, $C_{6-14}$ alkanecycloalkanediyl, and —[(—CHR$^3$—)$_s$—X—]$_q$—(—CHR$^3$—)$_r$—, wherein s, q, r, $R^3$, and X are as defined as for $R^1$;

m is an integer from 0 to 50;

n is an integer from 1 to 60;

p is an integer from 2 to 6;

B represents a core of a z-valent, polyfunctionalizing agent B(—V)$_z$ wherein,
 z is an integer from 3 to 6; and
 each V is a moiety comprising a terminal group reactive with a thiol; and each —V'— is derived from the reaction of —V with a thiol;

a polyepoxy curing agent comprising a novolac epoxy resin, a bisphenol A/epichlorohydrin derived epoxy resin, or a combination thereof; and a carrier-bound antioxidant comprising polybutylated bisphenol A bound to an inert carrier;

a catalyst;

a filler; and an adhesion promoter;

wherein the composition comprises:
 from 0.5 wt % to 5 wt % of the carrier-bound antioxidant;
 from 0.1 wt % to 5 wt % of the catalyst;
 from 5 wt % 60 wt % of the filler; and
 from 0.1 wt % to 15 wt % of the adhesion promoter, wherein wt % is based on the total weight of the composition.

10. The composition of claim 9, wherein, $R^1$ is —[(—CH$_2$—)$_s$—X—]$_q$—(CH$_2$)$_r$—, wherein s is 2, X is —O—, q is 2, r is 2;

$R^2$ is ethanediyl; and m is 2.

* * * * *